(12) United States Patent
Sharpe

(10) Patent No.: US 11,932,405 B2
(45) Date of Patent: Mar. 19, 2024

(54) CABIN BLOWER SYSTEM

(71) Applicant: ROLLS-ROYCE plc, London (GB)

(72) Inventor: Richard Sharpe, Leek (GB)

(73) Assignee: Rolls-Royce plc

( * ) Notice: Subject to any disclaimer, the term of this patent is extended or adjusted under 35 U.S.C. 154(b) by 312 days.

(21) Appl. No.: 17/514,399

(22) Filed: Oct. 29, 2021

(65) Prior Publication Data
US 2022/0161932 A1    May 26, 2022

(30) Foreign Application Priority Data

Nov. 23, 2020    (GB) .................................... 2018377

(51) Int. Cl.
  *B64D 13/06*    (2006.01)
  *B64D 13/02*    (2006.01)
  *F02C 7/36*     (2006.01)
(52) U.S. Cl.
  CPC ............. *B64D 13/06* (2013.01); *B64D 13/02* (2013.01); *F02C 7/36* (2013.01); *B64D 2013/0611* (2013.01); *B64D 2013/0644* (2013.01); *F05D 2220/32* (2013.01)
(58) Field of Classification Search
  USPC ..................................................... 454/76–77
  See application file for complete search history.

(56) References Cited

U.S. PATENT DOCUMENTS

| 10,385,915 B2 | 8/2019 | Himmelmann |
| 2016/0167789 A1 | 6/2016 | Knight et al. |
| 2017/0298830 A1 | 10/2017 | Ertas et al. |
| 2017/0305559 A1* | 10/2017 | Bruno ..................... F04D 25/06 |
| 2019/0233124 A1* | 8/2019 | Sharpe .................. F04D 13/021 |
| 2019/0233125 A1* | 8/2019 | Knight ..................... F16H 3/08 |

FOREIGN PATENT DOCUMENTS

| EP | 3584165 A1 | 12/2019 |
| EP | 3517436 B1 | 5/2020 |
| EP | 3517437 B1 | 5/2020 |
| EP | 3517438 B1 | 6/2020 |

OTHER PUBLICATIONS

Great Britain search report dated Jul. 26, 2021, issued in GB Patent Application No. 2018377.8.
Extended EP Search Report completed by the EPO on Mar. 9, 2022 and issued in connection with EP Patent Application No. 21204368.1.

* cited by examiner

*Primary Examiner* — Ko-Wei Lin
(74) *Attorney, Agent, or Firm* — Barnes & Thornburg LLP

(57) ABSTRACT

Aircraft cabin blower systems and methods of operating aircraft cabin blower systems are provided. One aircraft cabin blower system comprises: a cabin blower compressor having a contactless bearing arrangement; a transmission having a transmission output arranged to drive the cabin blower compressor, a first transmission input arranged to receive mechanical power from a gas turbine engine, and a second transmission input; a reversible variator arranged to receive power from the gas turbine engine and to output mechanical power to the second transmission input, the reversible variator operable to output in both forward and reverse directions of rotation; and a controller configured to control an output speed and direction of rotation of the reversible variator.

20 Claims, 8 Drawing Sheets

CABIN BLOWER SYSTEM

CROSS-REFERENCE TO RELATED APPLICATIONS

This specification is based upon and claims the benefit of priority from United Kingdom Patent Application No. 2018377.8, filed on 23 Nov. 2020, the entire contents of which are incorporated herein by reference.

BACKGROUND

Technical Field

This disclosure concerns cabin blower systems for aircraft. The disclosure also concerns aircraft having cabin blower systems and methods of operating cabin blower systems.

Description of Related Art

Cabin blower systems are used to pressurise the cabins of aircraft and to provide wing anti- or de-icing. Cabin blowers are typically driven by one or more associated gas turbine engines of the aircraft. The gas turbine engine may be used to drive a cabin blower compressor in a number of ways (e.g. using electrical power generated by the engine or mechanically). Where mechanical driving of the compressor is employed, drive is typically taken from a shaft of the gas turbine engine via an accessory gearbox. A means of varying the speed of the drive delivered to the compressor is also required; it is not desirable for the cabin air flow and pressure to be determined by the particular operating point of the gas turbine at any particular moment. Therefore a gearing mechanism such as a continuously variable transmission is also provided in the drive path between the accessory gearbox and compressor. This system ensures that regardless of engine operating point and ambient air pressure the cabin flow and pressure can be maintained within acceptable limits.

European Patent Number 3517436 B1 describes a cabin blower system for a gas turbine engine. The cabin blower system includes an electrical circuit comprising first and second electrical machines and a power management system. When operating in a blower mode of operation, the first electrical machine is configured to receive mechanical power from the gas turbine engine and acts as a generator to provide electrical power to the power management system, and the second electrical machine is configured to act as a motor receiving electrical power from the power management system and to provide mechanical power. The cabin blower compressor is driven by a transmission that has first and second inputs. The first transmission input receives mechanical power from the gas turbine engine. The second transmission input receives mechanical power from the second electrical machine. The speed of the output of the transmission, which drives the cabin blower compressor, depends on the speeds of the first and second inputs. Further cabin blower systems are described in EP 3517437 B1 and EP 3517438 B1.

A problem with previous cabin blower systems has been the contamination of the air supplied to the cabin, for example contamination with oil. It would be desirable to reduce or prevent such contamination.

SUMMARY

The Invention is defined in the appended claims, to which reference should now be made.

It is to be understood that the terms "forward direction" and "reverse direction" used herein are relative terms. The "forward direction" of rotation may be clockwise or anti-clockwise. Likewise the "reverse direction" of rotation may be clockwise or anti-clockwise. The forward and reverse directions are opposite directions.

According to a first aspect, there is provided an aircraft cabin blower system comprising: a cabin blower compressor having a contactless bearing arrangement; and a transmission having: a transmission output arranged to drive the cabin blower compressor; a first transmission input arranged to receive mechanical power from a gas turbine engine; and a second transmission input. The cabin blower system further comprises a reversible variator arranged to receive power from the gas turbine engine and to output mechanical power to the second transmission input, the reversible variator operable to output in both forward and reverse directions of rotation; and a controller configured to control an output speed and direction of rotation of the reversible variator. The speed of the transmission output is a function of a speed of the first transmission input, a speed of the second transmission input and the direction of rotation of the variator output, the second transmission input increasing the speed of the transmission output when the variator output rotates in the forward direction and reducing the speed of the transmission output when the variator output rotates in the reverse direction. The controller is configured so that, during a start-up process of the cabin blower system, the variator output is controlled to rotate in the reverse direction until a start-up threshold condition is satisfied. When the start-up threshold condition is satisfied, the variator output direction is reversed to rotate in the forward direction.

The use of contactless bearings in the cabin blower compressor eliminates a potential source of contamination because no oil or other similar lubricant is required in a contactless bearing. However, the use of contactless bearings could create increased wear during start-up of the cabin blower compressor because of insufficient clearance between the stationary and rotating parts of the bearings at low operating speeds. Embodiments described herein may address this problem by using the reverse operation of a reversible variator to hold the cabin blower compressor stationary, or at least at a reduced speed, whilst the engine shaft(s) accelerate to a point at which the cabin blower compressor can be quickly accelerated to a speed at which the contactless bearings 'lift-off'. In this way, the amount of operating time the bearing arrangement spends in the wear-inducing operating regime may be much reduced.

The controller may be configured to control the speed of the variator output so that, until the start-up threshold condition is satisfied, the speed of the transmission output is substantially equal to zero. In other words, the effect of the second transmission input on the speed of the transmission output may be equal and opposite to the effect of the first transmission input on the speed of the transmission output. Holding the cabin blower compressor stationary until such a time that it can be accelerated to the lift-off speed may minimise the wear to the bearings. A useful reduction in wear may, however, still be achieved if the cabin blower compressor and its bearings are held to a non-zero but reduced speed.

The contactless bearing arrangement may take the form of an air bearing arrangement or a magnetic bearing arrangement. In an air bearing arrangement, a cushion of air holds the inner-race of the bearing (which in this case is the cabin blower compressor shaft) away from the outer-race of the bearing. A sufficient cushion of air will only be developed when the inner-race rotates at or above a minimum speed, referred to herein as the lift-off speed. In a magnetic bearing arrangement, transverse magnetic forces are developed and controlled to overcome gravity and hold the inner-race centrally. A minimum speed of rotation, again referred to herein as the lift-off speed, may be required to generate sufficient transverse magnetic forces and/or implement effective control. An air bearing arrangement may be generally preferred due to relative ease of implementation.

The threshold condition may be defined so that, when the threshold condition is met and the variator rotates in the forward direction, the speed of the transmission output (after its resulting acceleration) is greater than or equal to a predefined output speed.

Suitable parameters for defining the threshold condition may depend on, amongst other things, whether or not the first transmission input and the variator input are connected to the same or different gas turbine engine shafts, which shaft(s) they are connected to, and the design and capabilities of the variator. Whichever parameters are used to implement the threshold condition, a suitable result may be that the when the threshold condition is satisfied, the transmission is able to accelerate the cabin blower compressor to a speed greater than or equal to a predefined, preferred minimum cabin blower speed. The predefined output speed may be a lift-off speed of the contactless bearing arrangement. That is, a speed—typically a design parameter of the contactless bearing arrangement—at which gravity is overcome and the bearing inner-race rotates without contact with the bearing outer-race.

The start-up threshold condition may be a threshold minimum speed for the first transmission input. In other words, the variator may be controlled to output in the reverse direction until the first transmission input reaches a threshold speed, at which point the variator output is reversed to the forward direction to accelerate the cabin blower compressor up to speed. The speed of the first transmission input may be a particularly suitable parameter for the threshold condition in a cabin blower system in which the first transmission input and the variator receive input from the same gas turbine engine shaft.

The aircraft cabin blower system may further comprise a disconnect arrangement for selectively disconnecting the cabin blower compressor from the gas turbine engine. The disconnect arrangement, or one or more additional disconnect arrangements, may additionally or alternatively connect the transmission and/or variator from the gas turbine engine. Providing a disconnect arrangement, for example a clutch arrangement or an electro-mechanical disconnect arrangement, allows isolation of blower system components in case of faults or operational issues. Furthermore, in some embodiments the variator may have a minimum input speed below which it cannot generate a useful output. Thus, a disconnect arrangement may be used to prevent the connection of the rotating engine shaft(s) to the cabin blower compressor (or to the first transmission input and the variator input) until a minimum variator input speed is reached. This may be used to avoid a 'dead zone' of operation in which the variator output cannot oppose the first transmission input and in which some bearing wear may take place.

The variator input may receive mechanical power or electrical power from the gas turbine engine. For example, the variator may receive electrical power from a generator coupled to one of the shafts of the gas turbine engine, for example a permanent magnet alternator of the gas turbine engine. Alternatively, the cabin blower system may be treated as an aircraft accessory rather than an engine system, in which case the variator may receive electrical power from an aircraft electrical system, which would also generate its electrical power by connection to one or more shafts of one or more gas turbine engines of the aircraft.

The first transmission input and the reversible variator may receive power, for example mechanical power, from the same shaft of the gas turbine engine. Alternatively, the first transmission input may receive mechanical power from a first shaft of the gas turbine engine and the reversible variator may receive mechanical power from a second shaft of the gas turbine engine, the first and second shafts being different shafts. It will be understood that in any cabin blower system described herein, the transmission and variator inputs will typically not be connected directly to the main spool(s) of the engine but will be connected via intermediate arrangements, for example via an accessory gearbox having a tower shaft or other suitable connection to the main spool(s). In one embodiment, both the first transmission input and the variator input are connected to a high pressure (HP) shaft of the gas turbine engine. In another embodiment, both the first transmission input and the variator input are connected to an intermediate pressure shaft (IP) shaft of the gas turbine engine. In a further embodiment still, one is connected to the HP shaft and the other to the IP shaft. In each case, the connection may be via an accessory gearbox or a dedicated drive.

The reversible variator may be a reversible electric variator; a reversible hydraulic variator; or a reversible toroidal variator. Examples described herein use an electric variator, but in practice any variator with a reversible output could be used.

The output speed of the reversible variator may be continuously variable. In other words, the output speed of variator can be controllably-varied in a continuous manner within an operating envelope. The available envelope may depend, to some extent, on the present variator input speed. Alternatively, a reversible variator with a stepped output could be used.

The transmission may be a summing gearbox, and may be a summing epicyclic gearbox.

The aircraft cabin blower system may further have a starter mode of operation. In the starter mode of operation the reversible variator, and/or the transmission, outputs mechanical power to the gas turbine engine to facilitate starting of the gas turbine engine. The cabin blower system may be used in reverse as an air turbine starter, with the cabin blower compressor operating in reverse as an expander and the transmission outputting mechanical power to the gas turbine engine shaft(s) via the first transmission output and/or the second transmission output. Where an electric variator is used with an electrical energy storage unit or external power supply, the variator may be used to electrically start the engine.

The reversible variator may be an electric variator comprising: a power management system; a first electrical machine arranged to receive, in a blower mode of operation, mechanical power from the gas turbine engine and to output electrical power to the power management system; and a second electrical machine arranged to receive, in the blower mode of operation, electrical power from the power management system and to output mechanical power to the second transmission output. At least the second electrical machine is operable to rotate in both the forward and reverse directions of rotation so as to provide the reversible output of the variator.

In the blower mode of operation, the power management system may be operable to provide electrical power to the second electrical machine at a rate different from a rate of power received by the power management system from the first electrical machine.

The power management system may comprise an electrical energy storage device, for example a battery or capacitor, whereby the second electrical machine can receive, in the blower mode of operation, electrical power from both the first electrical machine and the electrical energy storage device. As noted previously, an electrical energy storage device may be used to operate the cabin blower system as an electric starting mechanism. Additionally or alternatively, during normal use in the cabin blower mode of operation, an electrical energy storage device may be used to supplement the output of the second electrical machine or to absorb electrical energy from the first electrical machine. Furthermore, during the start-up procedure of the cabin blower system, an electrical energy storage device may be used to avoid the 'dead zone' referred to above, by supplying electrical power to drive the second electrical machine until such a time as the engine shaft(s) reach a minimum speed required to drive the variator.

The power management system may be arranged to receive electrical power from an external power source. The external power source may be one of a ground cart and an aircraft auxiliary power unit. These may be used to start the cabin blower system or to start the engine using the cabin blower system in the starter mode of operation.

According to a second aspect, there is provided an aircraft comprising an aircraft cabin blower system according to first aspect.

According to a third aspect, there is provided a method of operating an aircraft cabin blower system. The aircraft cabin blower system comprises a cabin blower compressor having a contactless bearing arrangement; a transmission having a transmission output arranged to drive the cabin blower compressor, a first transmission input arranged to receive mechanical power from the gas turbine engine, and a second transmission input arranged to receive mechanical power from an output of a reversible variator. The method comprises the steps of: receiving inputs from the gas turbine engine at the first transmission input and an input of the variator; controlling a direction of rotation of the variator output so that the first and second transmission inputs oppose each other; determining that the inputs at the first transmission input and the variator input satisfy a start-up threshold condition; and responsive to the determination, reversing the direction of rotation of the variator output.

The method may further comprise, prior to determining that the inputs satisfy the start-up threshold condition: controlling a speed of rotation of the variator output so that the speed of the transmission output is substantially equal to zero when the start-up threshold condition is not satisfied.

Determining that the start-up threshold condition is satisfied may comprise: determining that a speed of the first transmission input and/or the variator input is greater than or equal to a minimum input speed. As noted previously, suitable threshold conditions may depend on, amongst other things, whether the first transmission input and variator receive power from the same or different engine shafts and which shafts they are connected to.

After reversing the direction of rotation of the variator output, and allowing time for the resulting acceleration of the cabin blower compressor, a speed of the transmission output may be greater than or equal to a lift-off speed of the contactless bearing arrangement of the cabin blower compressor.

The speed of the transmission output may be equal to $Z=X\pm Y$, X being a contribution to the speed of the transmission output from the first transmission input and Y being a contribution to the speed of the transmission output from the second transmission input. Y may have a predefined maximum value of $Y_{MAX}$. X may increase during a start-up of the cabin blower system. The start-up threshold condition may be satisfied and the direction of rotation of the variator output reversed before X is equal to $Y_{MAX}$. This may ensure that the cabin blower does not begin spinning before the direction of the variator output is reversed.

According to a fourth aspect, the controller of the first aspect is separately provided.

According to fifth and sixths aspects, there are provided a computer program comprising code and a computer readable medium having code stored thereon. The code, when executed by one or more controllers in a cabin blower system according to the first or third aspect, causes the one or more controllers to perform the determination and control steps of the method of the third aspect. The computer readable medium may be a non-transitory computer readable medium of any suitable type known in the art.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
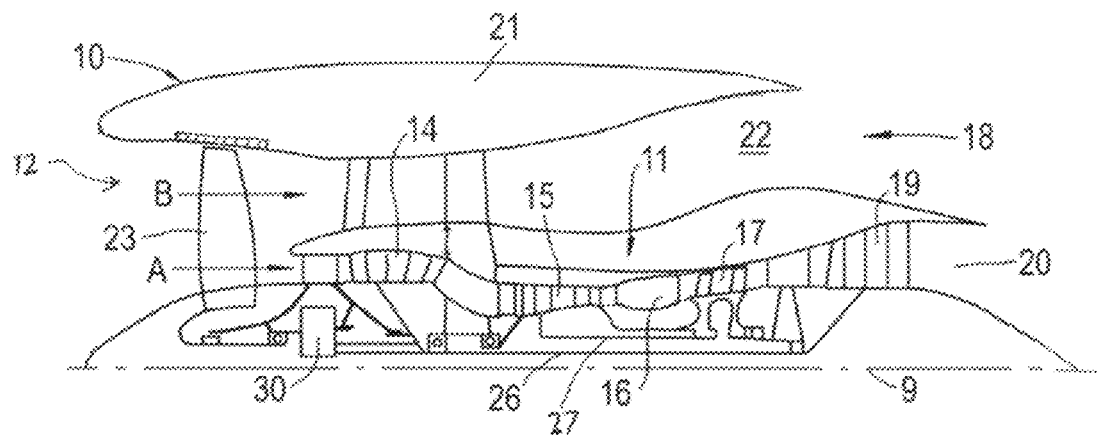
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox is a reduction gearbox.

Figure 2:
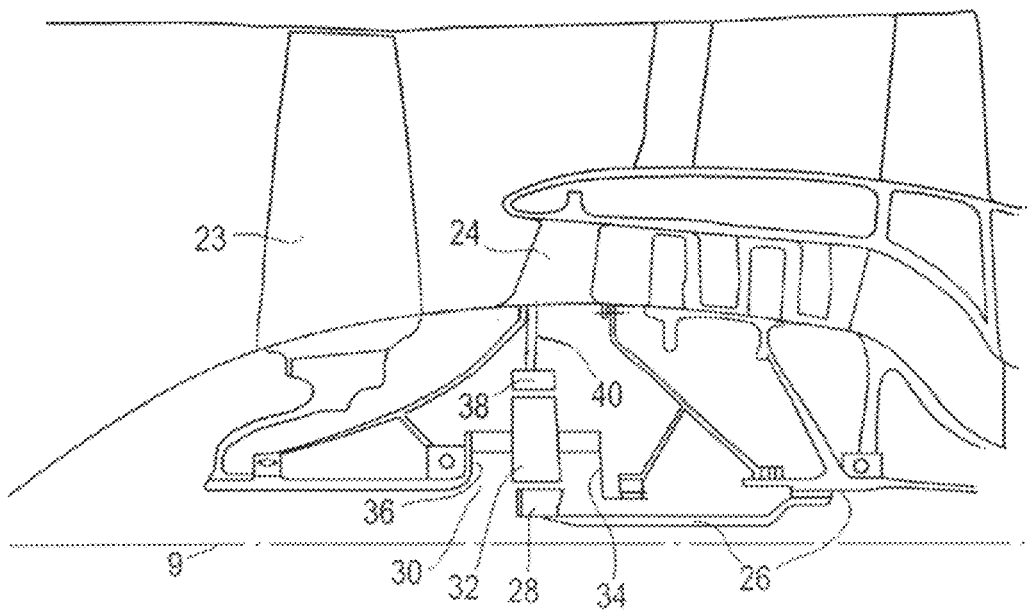
FIG. 2 is a close-up sectional side up view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
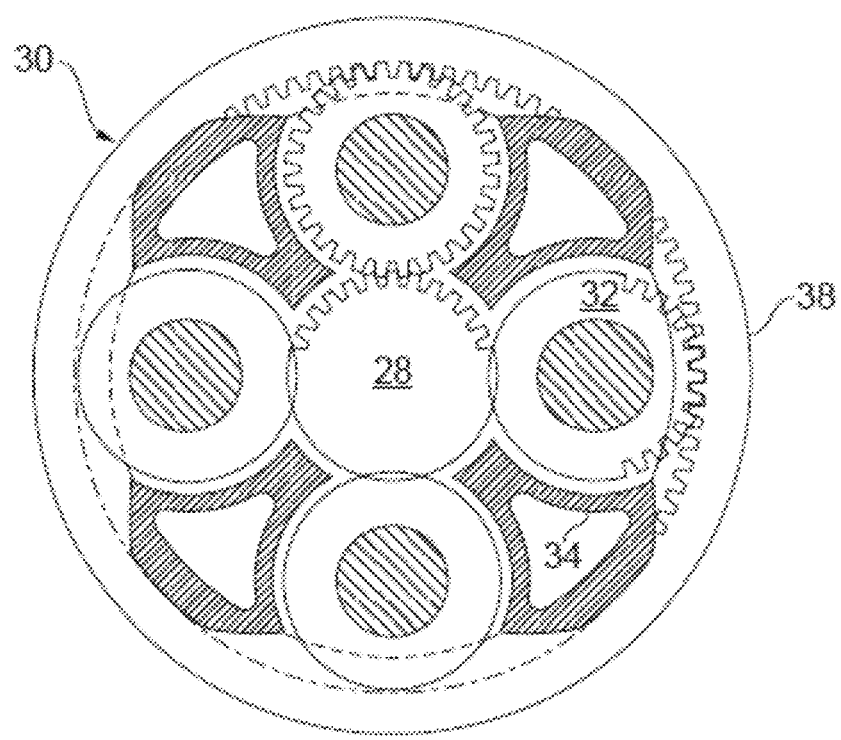
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
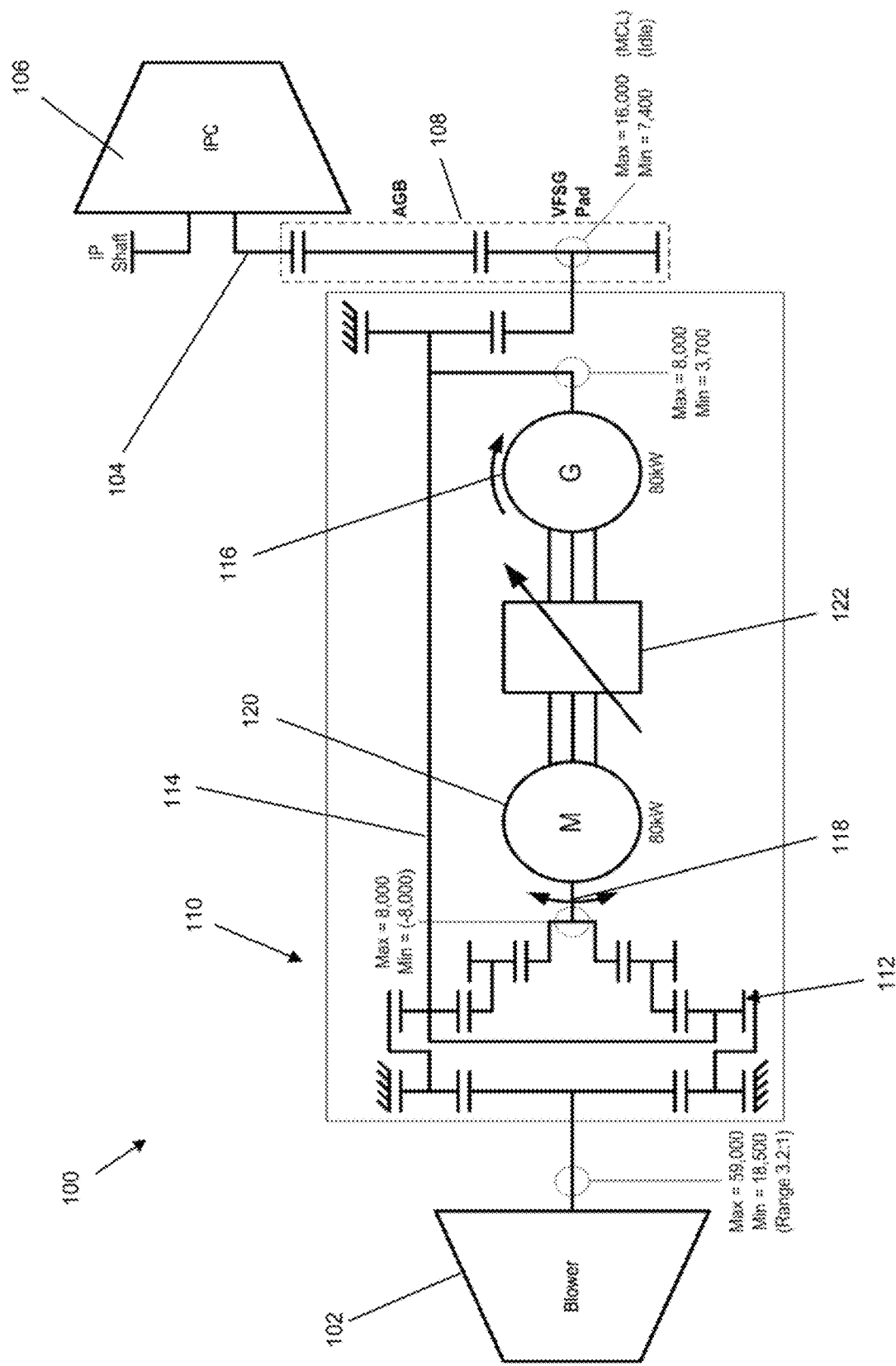
FIG. 4 is a schematic illustration of an embodiment of an aircraft cabin blower system.

Referring now to FIG. 4, a first embodiment of an aircraft cabin blower system 100 is depicted in schematic form. The cabin blower system 100 includes a cabin blower compressor 102 and a power source in the form of an intermediate-pressure shaft 104 of an intermediate-pressure compressor 106 of a gas turbine engine. The intermediate-pressure compressor 106 powers an accessory gearbox 108 of the gas turbine engine, which, in turn, provides power to a transmission 110 of the cabin blower system 100. The accessory gearbox 108 may be powered by the low-pressure shaft, intermediate-pressure shaft, or the high-pressure shaft of any gas turbine engine.

The transmission 110 comprises a summing epicyclic gearbox 112 with two inputs. A first transmission input 114 of the epicyclic gearbox 112 is provided mechanically from the accessory gearbox 108 to a part of the epicyclic gearbox 112. The accessory gearbox 108 also provides mechanical power to a first electrical machine 116 which, in a blower mode of the cabin blower system 100, operates as a generator to convert the mechanical power received from the accessory gearbox 108 to electrical power. A second transmission input 118 of the epicyclic gearbox 112 is provided from a second electrical machine 120 which, in the blower mode of the cabin blower system 100, operates as a motor to convert electrical power to mechanical power, which is provided to the epicyclic gearbox 112.

A power management system 122 interconnects the first electrical machine 116 and second electrical machine 120. In the blower mode being described here, the power management system 122 receives electrical power from the first electrical machine 116 and sends said power to the second electrical machine 120. Thus, despite in this embodiment both the first electrical machine 116 and the second electrical machine 120 being 80 kW motor-generators, the second electrical machine 120 can be driven as a motor at a different speed from the speed of the first electrical machine 116 acting as a generator at that time. Moreover, the power management system 122 can provide a continuously-variable difference between the power received from the first electrical machine 116 and the power output to the second electrical machine 120.

The power management system 122 can include electrical storage, in the form for example of one or more batteries, capacitors or similar, that enables the power management system to output more power than is being received by the power management system at any moment.

The epicyclic gearbox 112, as previously mentioned, is a summing epicyclic gearbox configured to have an output that is a function of the speeds of the first input 114 and the second input 118. In the present embodiment, the first input 114 is always positive (i.e., in the forward direction), resulting in operation of the compressor 102. The second input 118, which can be rotated either positively (the forward direction) or negatively (i.e., in the reverse direction) by the second electrical machine 120, acts to provide either a positive (forward) or negative (reverse) input to the epicyclic gearbox 112. Thus, the output of the epicyclic gearbox 112 that feeds to the compressor 102 can be adjusted continuously by the operation of the second electrical machine 120 such that the output is greater or less than that which would be provided were the only input to the epicyclic gearbox 112 to be the first input 114. The function of the epicyclic gearbox 112 may result in the output being the sum of the first and second inputs 114, 118 or may otherwise be related to the difference by way of a ratio provided by the epicyclic gearbox 112, for example.

The operation of a summing epicyclic gearbox 112 will be known to the person skilled in the art and therefore alternative implementations will be apparent. Moreover, other forms of summing gearbox may also be used, in addition to or as a replacement for the epicyclic gearbox 112 depicted.

As the speed of the accessory gearbox 108 may vary with operation of the gas turbine engine, the present embodiment can be operated to enable the output of the cabin blower compressor 102 to be at a speed required by an aircraft, to create the desired temperature, pressure, or air flow-rate. This can be managed without any power loss associated with bleed valves or other such features, although these could also be included for emergency operation, if required.

In addition to operation in the blower mode, the cabin blower system 100 can also be operated in a starter mode in order to provide mechanical input to the gas turbine engine to facilitate a start operation of the gas turbine engine. The cabin blower compressor 102 can operate in reverse as an expander to provide drive to the epicyclic gearbox 112 from a supply of compressed air.

The second electrical machine 120 can then be held still such that the transmission 110 transmits the mechanical power from the compressor 102 to the accessory gearbox 108. The accessory gearbox 108 will in turn cause the intermediate-pressure compressor 106 to rotate, which facilitates starting of the gas turbine engine. The remaining steps required for the successful ignition of a gas turbine engine will be known to the person skilled in the art and are therefore not discussed in the present disclosure.

In addition to the input from the compressor 102, the first electrical machine 116, which operated in the blower mode as a generator, can be powered by the power management system 122 such that the first electrical machine 116 acts as a motor, in the starter mode. The mechanical power generated by the first electrical machine 116 can therefore be added to that provided by the compressor 102, both the compressor 102 and the first electrical machine 116 causing rotation of the accessory gearbox 108 and thus intermediate-pressure compressor 106. As such, the present embodiment both provides a variable speed compressor 102 and an electrically-assisted starting operation for a gas turbine engine.

Torque shunting may be utilised to direct the mechanical power output by the compressor 102 to the accessory gearbox 108 to start the gas turbine engine. The central sun gear of the epicyclic gearbox 112, driven by the compressor 102, puts torque into the transmission 110. This torque takes the easiest available route, through to the second motor-generator 120 which is easier to turn than the accessory gearbox 108. The second motor-generator 120 now acts as a generator, putting power through the power management system 122, allowing the first motor-generator 116 to spin the accessory gearbox 108. A function of the power management system 120 is that it can spin the motor-generators 116, 120 in either direction, and in this case the power management system 122 spins the first motor-generator 116 in the correct direction for engine starting. Torque is then reflected back through the second motor-generator 120, which encourages the input torque from the blower compressor 102 to be directed toward the accessory gearbox 108 through the first transmission input 114 (which in this mode of operation is an output). This functionality may be termed torque shunting and is a balancing act between the second motor-generator 120 (inputting torque via the second transmission 'input' 118) and the torque-split carrier (the first transmission 'input' 114). Newton's third law, namely that every action has an equal and opposite reaction, is involved; the torque is transferred from the blower compressor 102 to the accessory gearbox 108 via the electrical path 120, 122, 116 and the mechanical path 114, just as it is during normal blower operation, albeit in the opposite direction.

Figure 5:
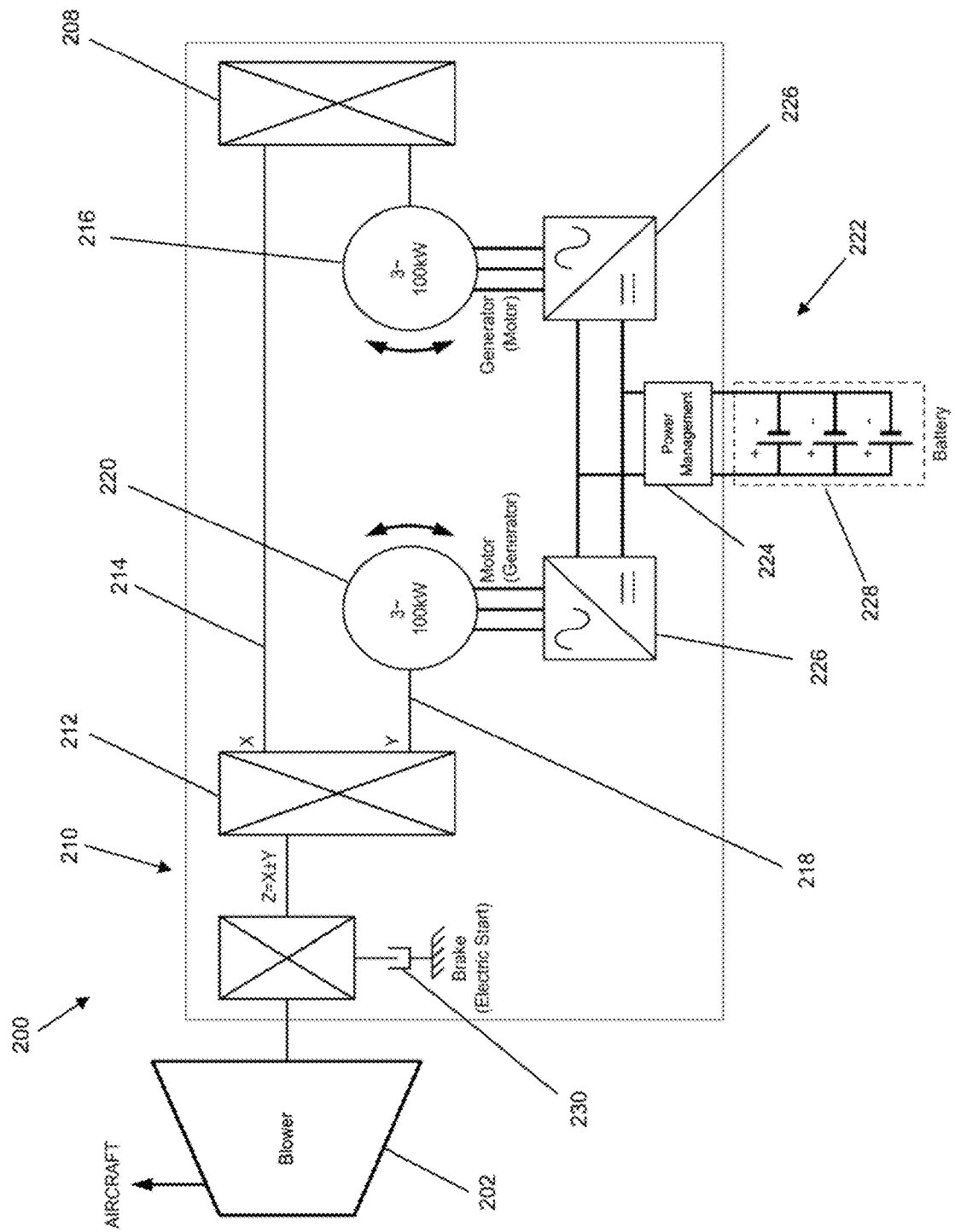
FIG. 5 is a schematic illustration of another embodiment of an aircraft cabin blower system.

A second embodiment is depicted in simplified schematic form in FIG. 5. The second embodiment operates in much the same way as the first embodiment, differing in only some features. Therefore, for brevity, only the differences between the second embodiment and the first embodiment will be discussed in detail. Similar reference numerals are used for similar features, with the first digit of the reference indicating the embodiment to which it refers.

A power management system 222 of the second embodiment of a cabin blower system 200 includes a power management circuit 224 that coordinates power receipt and transmission from an AC/DC converter 226 associated with each of a first electrical machine 116 and a second electrical machine 120. A battery 228 is also provided that enables power to be stored. This power can therefore be used during blower mode operation to allow the second electrical machine 220 to work as a motor with a greater power output than that being generated by the first electrical machine 216 at that moment. Additionally, the power management system 222 of the second embodiment allows starter mode operation using electrical power alone.

A brake 230 is provided that acts on a part of a transmission 210 between an epicyclic gearbox 212 and a compressor 202. With the brake 230 actuated, the shaft of the epicyclic gearbox 212 that powers the compressor 202 is prevented from moving. The power management system 222 can therefore power both the first electrical machine 216 and the second electrical machine 220 from the battery 228 such that they both act as motors. As in the first embodiment, the first electrical machine 216 feeds directly to an accessory gearbox 208, and the second electrical machine 220 feeds to the epicyclic gearbox 212. However, as the compressor shaft is braked, mechanical power from the second electrical machine 220 is transmitted through the epicyclic gearbox 212 and to the accessory gearbox 208. Thus, a solely-electric starter mode can be implemented by the second embodiment. Epicyclic gearbox 212 has first and second transmission inputs 214, 218.

Although the solely-electric starter mode is enabled, airstarting by passing compressed air in reverse through the compressor 202 can be implemented in the same manner as in the first embodiment.

A further benefit of the inclusion of energy storage, in the second embodiment provided through use of the battery 228, is that the energy can be used after shutdown of the engine to maintain rotation of the engine. Relatively slow rotation of the engine, compared to normal operating speeds, acts to even out any thermal gradients that may otherwise be formed or remain in the engine once shut down by allowing heat to dissipate evenly through the rotating shaft. Without cooling, such thermal gradients can cause distortion of casing and shafts leading to vibration and rubbing of some components, such as compressor linings. The stored energy could additionally or alternatively be used to power aircraft function during unpowered descents, such as maintaining electrical power and powering aircraft control surfaces. Energy storage could also be provided by way of ground power, auxiliary power unit (APU) or Seebeck effect devices on the aircraft.

Figure 6:
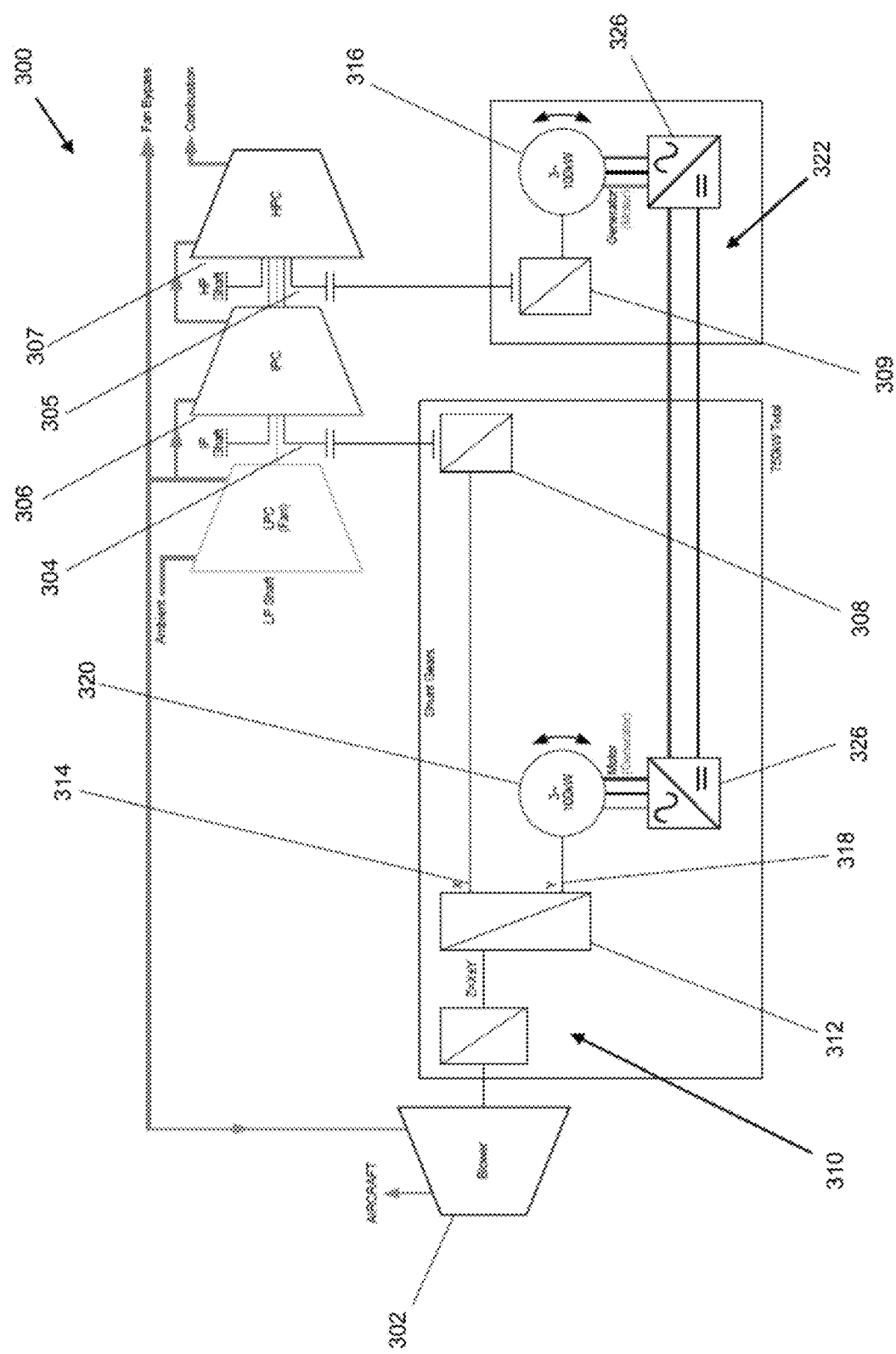
FIG. 6 is a schematic illustration of another embodiment of an aircraft cabin blower system.

Referring now to FIG. 6, a third embodiment of an aircraft cabin blower system 300 is depicted in schematic form. The cabin blower system 300 includes a cabin blower compressor 302 and power sources in the form of an intermediate-pressure shaft 304 of an intermediate-pressure compressor 306 and a high-pressure shaft 305 of a high-pressure compressor 307 of a gas turbine engine. The intermediate-pressure shaft 304 powers a first accessory gearbox 308 of the gas turbine engine, which, in turn, provides power to a transmission 310 of the cabin blower system 300. The transmission 310 comprises, like the transmissions 110, 210 described above, a summing epicyclic gearbox 312 with two inputs. A first input 314 of the epicyclic gearbox 312 is provided mechanically from the first accessory gearbox 308 to the epicyclic gearbox 312.

The high-pressure shaft 305 powers a second accessory gearbox 309 of the gas turbine engine, which, in turn, provides power to a first electrical machine 316. In a blower mode of the cabin blower system 300, the first electrical machine 316 operates as a generator to convert the mechanical power received from the second accessory gearbox 309 to electrical power.

A second input 318 of the epicyclic gearbox 312 is provided from a second electrical machine 320 which, in the blower mode of the cabin blower system 300, operates as a motor to convert electrical power to mechanical power, which is provided to the epicyclic gearbox 312.

A power management system 322 interconnects the first electrical machine 316 and second electrical machine 320. The power management system 324, in the present case, includes two AC/DC converters 326, one associated with each electrical machine 316, 320, the AC/DC converters 326 being interconnected. In the blower mode being described here, the power management system 322 receives electrical power from the first electrical machine 316 and sends said power to the second electrical machine 320. Thus, despite in this embodiment both the first electrical machine 316 and second electrical machine 320 being similar-sized motor-generators, the second electrical machine 320 can be driven as a motor at a different speed from the speed of the first electrical machine 318 acting as a generator at that time. Moreover, the power management system 322 can provide a continuously-variable difference between the power received from the first electrical machine 316 and the power output to the second electrical machine 320. For example, the first electrical machine 316 and the second electrical machine 320 may be 100 kW motor-generators.

It will be clear that the power management system 322 can, like the power management system 222 described above, include electrical storage, in the form of batteries or similar.

As the speed of the first and second accessory gearboxes 308, 309 may vary with operation of the gas turbine engine, the present embodiment can be operated to enable the output of the cabin blower compressor 302 to be at a speed required by an aircraft, to create the desired temperature, pressure, or air flow-rate. This can be managed without any power loss associated with bleed valves or other such features, although these could also be included for emergency operation, if required.

In addition to operation in the blower mode, the cabin blower system 300 can also be operated in a starter mode in order to provide mechanical input to the gas turbine engine to facilitate a start operation of the gas turbine engine. The cabin blower compressor 302 can operate in reverse as an expander to provide drive to the epicyclic gearbox 312 from a supply of compressed air.

The second electrical machine 320 can then be held still such that the transmission 310 transmits the mechanical power from the compressor 302 to the first accessory gearbox 308. The first accessory gearbox 308 will in turn cause the intermediate-pressure compressor 306 to rotate, which facilitates starting of the gas turbine engine.

In addition to the input from the compressor 302, the first electrical machine 316, which operated in the blower mode as a generator, can be powered by the power management system 322 in order that it acts as a motor when in the starter mode. The mechanical power generated by the first electrical machine 316 can therefore be applied to the high-pressure compressor 307 to assist with engine start. As such, the present embodiment can provide drive to either or both of the intermediate-pressure compressor 306 and the high-pressure compressor 307.

Figure 7:
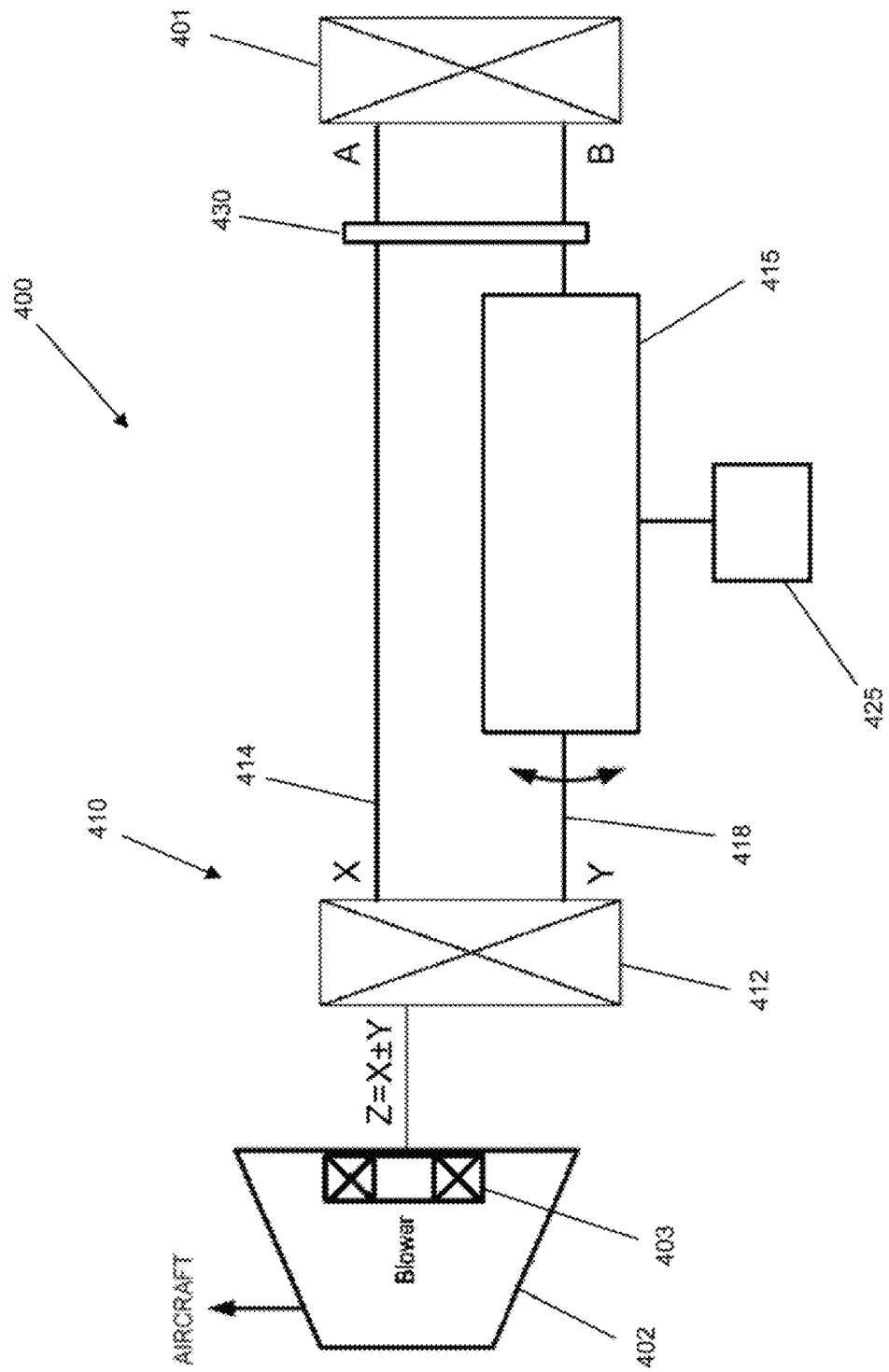
FIG. 7 is a schematic illustration of an embodiment of an aircraft cabin blower system in accordance with the present disclosure.

FIG. 7 illustrates a cabin blower system 400 in which a shaft of the cabin blower compressor 402 runs on contactless bearings 403. The cabin blower system 400 further includes a transmission 410, a reversible variator 415 and a controller 425 for controlling the reversible variator.

The transmission 410, which may be the same as any of the transmissions 110, 210, 310 described above, includes a summing gearbox 412 having a transmission output (Z) which drives the shaft of the cabin blower compressor 402. Like the transmissions described above, the transmission 410 also includes a first transmission input 414 and a second transmission input 418. The first transmission input 414 receives mechanical power input (A) from a gas turbine engine associated with the cabin blower system. The second transmission input 418 receives mechanical power from an output of the reversible variator 415.

The reversible variator 415 receives an input (B) from the gas turbine engine and provides a variable, reversible mechanical output to the second input of the transmission 418. Where the input is mechanical, the variator 415 receives a mechanical input (B) at a first speed and provides a mechanical output at a second speed, the second speed being controllably variable. Furthermore, the direction of rotation of the output can be controlled to be either in the forward direction (positive) or in the reverse direction (negative).

The reversible variator 415 can take any suitable form, i.e. any form that can receive an input and provide a variable and reversible mechanical output to the second transmission input 418. The variator 415 can, for example, be any one of the reversible electric variators described above with reference to FIGS. 4-6. In each of these cases, the reversible variator is the combination of the first electrical machine 116, 216, 316; the second electrical machine 120, 220, 320; the power management system 122, 222, 322; and optionally the energy storage device 228. In each case, the second electrical machine delivers a variable, reversible output based on the electrical power it receives from the power management system which itself receives electrical power from the first electrical machine when operating as a generator in the blower mode. The variator could also be of the toroidal type, for example the type described in EP 3517437 B1. Alternatively, the reversible variator 415 can take another form such as a reversible hydraulic variator, the detailed operation of which is beyond the scope of the present disclosure but will be known and understood by those skilled in the art.

The output of the variator is preferably continuously variable, like that of the electric variators described above. However, a variator with a stepped output could also be used. A system with a stepped output is described in the publication US 2016/0167789 A1.

The controller 425 controls the speed and direction of the output of the variator 415. In some embodiments, the controller 425 forms part of the power management system 122, 222, 322 of the variator 415 and controls the speed and direction of the output by controlling the power and e.g., current direction delivered to the second electrical machine 120, 220, 320. The controller may be implemented in hardware, software or a combination of the two, and may be a module of another controller, for instance a Full Authority Digital Engine Controller (FADEC) of the gas turbine engine, as will be understood by those skilled in the art. The role of the controller 425, particularly in the start-up of the cabin blower system 400, will be described in more detail below with reference to FIG. 8.

As noted previously, the first transmission input 414 and the variator 415 receive power from an associated gas turbine engine. The connection between the gas turbine engine shaft(s) and the cabin blower system is illustrated in FIG. 7 by the arrangement 401 and its outputs A, B. The arrangement 401 can take any suitable form: the cabin blower system 400 of the present invention is not tied to any particular arrangement. For example, as in FIG. 4, the arrangement 401 could be a single accessory gearbox 108 driven by the IP shaft 104 of the engine, with both the first transmission input 414 and the input of the variator 415 coming from the same accessory gearbox. The use of the IP shaft may be preferred due to the improvements in engine operability it can provide, but the lower speed ratio (maximum shaft speed:minimum shaft speed) of the HP shaft may make the HP shaft a more suitable choice in many implementations. As another example, as in FIG. 6, the arrangement 401 could include two different accessory gearboxes 308, 309 driven by the IP and HP shaft respectively. In other examples the arrangement 401 may not include any accessory gearbox, and could instead include one or a pair or electrical machines, with outputs A and B coming from the rotor outputs of the electrical machines. The electrical machines may receive electrical power generated using the gas turbine engine.

As with the transmissions 110, 210, 310, described previously, the speed of the transmission output (Z) of the transmission 410 is a function of the speeds of the first and second transmission inputs 414, 418 and the direction of rotation (forward or reverse) of the output of the variator 415. Specifically, the output speed Z will be equal to X±Y. X is the contribution of the first transmission input 414, and will generally be a fixed multiple of the speed of the output A. Y is the contribution of the second transmission 418, and will generally be a fixed multiple of the speed of the output of the variator 415. Since the variator output can rotate in both forward and reverse direction, the contribution of the second transmission input 418 can be either positive (forward direction) or negative (reverse direction). In this way, rotation of the cabin blower compressor 402 can be driven over a range of speeds by modifying the shaft speed(s) of the engine shaft(s) and/or the output speed of the variator 415.

It will be understood that the cabin blower system 400 may also have a starter mode of operation in which mechanical power is transmitted from the cabin blower system 400 to one or more engine shafts to the start the engine. The starter mode of operation, including both an air turbine start mode and an electric start mode utilising a brake 230, have been described above and for brevity the description will not be repeated here.

As mentioned above, the bearing arrangement 403 that supports the shaft of the cabin blower compressor 402 is a contactless bearing arrangement. In a contactless bearing, the inner-race (in this case the blower shaft) does not contact the outer-race and so no oil or other similar lubricant is required. The use of a contactless bearing arrangement 403 thus eliminates a potential source of contamination of the air that is supplied to the aircraft cabin by the cabin blower system 400.

In one embodiment, the contactless bearing arrangement 403 takes the form an air bearing arrangement. In an air bearing, instead of a layer of oil, the inner-race spins on a cushion of air that prevents gravity from the forcing the inner-race into contact with the outer-race. In another embodiment, the contactless bearing arrangement 403 takes the form a magnetic bearing arrangement. In a magnetic bearing, instead of a layer of oil, the inner-race is magnetically levitated so that it is held away from the outer-race.

A problem with the use of a contactless bearing arrangement 403 is that bearing wear can occur during start-up of the cabin blower compressor 402 due to unlubricated contact between the inner-race and outer-race. In an air bearing arrangement, this is because a cushion of air sufficient to support the shaft will be generated only when the inner-race is rotating at a given speed, sometimes referred to as the 'lift-off' speed of the bearing. In a magnetic bearing, the magnetic levitation requires transverse magnetic forces sufficient to overcome the weight of the inner-race, and sufficient transverse force may not be developed until the inner-race is rotating quickly enough. This may the case where, for example, the levitating transverse forces require a magnetic field to be induced by the rotation of the inner-race, the strength of the induced field being proportional to the speed of rotation.

This problem may be addressed by using the reversible output of the variator 415 to oppose the contribution of the first transmission input 414 until the shaft(s) of the gas turbine engine that drive the cabin blower system 400 reach speeds sufficient to quickly accelerate the cabin blower compressor 402 to or beyond the lift-off speed of the contactless bearings 403. At this point, the output of the reversible variator 415 can be reversed into the forward (positive) direction to accelerate the cabin blower compressor up to speed.

It is contemplated that this technique could also be applied to cabin blower systems having conventional (i.e. not contactless) bearings. Although conventional bearings do not have a lift-off speed, some types of bearing experience a higher coefficient of friction at low operating speeds, such that the technique described above may be used to quickly bypass a higher-friction operating regime. The combination of the technique with a polycrystalline diamond (PCD) bearing arrangement may be of particular utility, since PCD bearings can have sufficiently low friction that they require little if any supplementary lubricant and thus could be used without contamination of the air supplied by the blower system.

Figure 8:
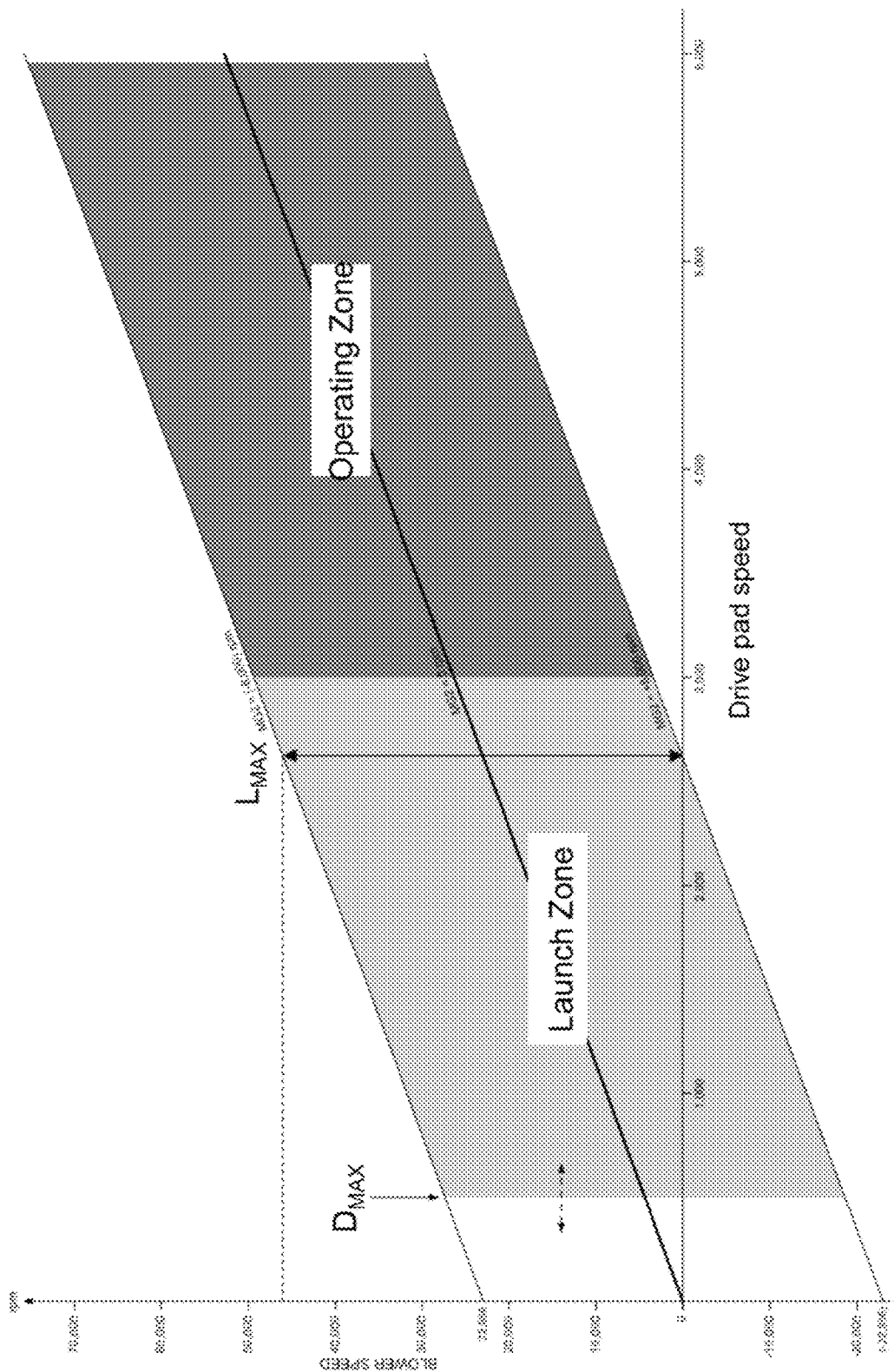
FIG. 8 is a graph illustrating operating regions of a cabin blower system.

FIG. 8 is a graph illustrating operating parameters of a cabin blower system 400. In this particular example, both the first transmission input 414 and the input of the variator 415 are driven by an accessory gearbox that is driven by the HP shaft. The accessory gearbox drive pad speed, which is proportional to the HP shaft speed, is plotted on the horizontal axis and the cabin blower compressor speed is plotted on the vertical axis.

The straight line through the origin of the graph represents the speed of the cabin blower compressor 402 when the output speed of the variator 415 is zero, such that Z=X, X being the contribution of the first transmission input 414 that is proportional to the HP shaft speed. Two parallel lines, one intersecting the vertical axis at a positive value and the other intersecting the vertical axis at a negative value are also shown. These parallel lines represent the blower speed when the second transmission input 418 is at a maximum in the forward (positive value) and reverse (negative value) directions. In this particular case the maximum contribution of the second transmission input is $Y_{MAX}=\pm 22,956$ rpm, which is a fixed multiple of about 2.87 times the variator maximum speed of $\pm 8,000$ rpm. The cabin blower system 400 can run at any speed between the two parallel lines, with the exception of the 'dead zone' described below.

The area between the two lines is illustratively divided into three regions. The right-most region with the darkest shading is the normal operating zone in which the cabin blower operates during normal flight (i.e. during take-off, cruise etc.). In this zone the speed of the HP shaft is relatively high, and the speed of the cabin blower is adjusted to meet the demand by controlling the speed and direction of the variator output. It will be appreciated that variation of HP shaft speed could also be used to adjust the cabin blower speed, but that the HP shaft speed will generally be dictated by other operating requirements, particularly engine thrust.

The middle region with light grey shading, in which the HP shaft speed is lower, does not correspond to normal use of the cabin blower. However, the system must pass through this middle region to reach the operating zone. For reasons explained below, the middle region is referred to herein as the cabin blower launch zone, although this zone may also be used for other operating modes, in particular a starter operating mode of the cabin blower system.

The left-most zone with no shading, in which the drive pad speed is between zero and a relatively small value labelled $D_{MAX}$ ($D_{MAX}$ is approximately 400 rpm in FIG. 8), is referred to herein as the 'dead zone'. The dead zone is the operating region in which the HP shaft speed (or other shaft speed(s) in other embodiments) is too low for the variator 415 to produce a useful output. Thus, in the dead zone, the cabin blower speed is limited to the straight line through the origin. The existence and size of the dead zone will depend on the chosen design of the variator 415 and other system implementation details, for example the physical size and inertia of the rotor of the cabin blower compressor, the rotor(s) of the variator and, if present, the specifications of the power electronics that cooperate with the electrical machines of the variator.

Start-up of the cabin blower system 400 will now be described.

As discussed previously, the contactless bearing arrangement 403 has a lift-off speed below which bearing wear occurs. The lift-off speed will depend on the bearings and e.g., the mass of the cabin blower rotor but may be of the order of about 4,000 rpm. It would be preferable to reduce bearing wear by reducing the amount of time in which the cabin blower compressor 402 spins at speeds below the lift-off speed. It is not possible to completely avoid operation below the lift-off speed, since neither the HP shaft nor the cabin blower compressor can be instantaneously accelerated up to speed, but the amount of time spent below the lift-off speed scan be reduced as follows.

As the HP shaft begins to rotate, the speed of the first transmission input 414 increases. In response, the controller 425 controls the reversible variator 415 to rotate in the reverse direction so that the second transmission input 418 opposes the first transmission input 414. In other words, Z=X−Y. By appropriately controlling the output speed for the variator 415 as the HP shaft speed increases, the transmission output speed can be held at zero, i.e. X=Y and Z=X−Y=0. Thus, the cabin blower speed remains at zero whilst the HP shaft accelerates.

Eventually, whilst the cabin blower speed is held at zero, the sum $X+Y_{MAX}$ will become greater than or equal to the lift-off speed of the bearing arrangement 403. Thus, when this threshold condition is met, the output of the variator 415 can be reversed to the forward direction. After a short period of acceleration, the cabin blower speed will become Z=X+Y, which is greater than or equal to the lift-off speed.

Whilst the direction of the variator output may be reversed as soon as the sum $X+Y_{MAX}$ exceeds the lift-off speed of the contactless bearings 403, it may be advantageous to delay the reversal of the variator output somewhat longer. In this way, the cabin blower compressor 402 will take less time to accelerate from zero to a speed that is faster than the lift-off speed. Thus, even less bearing wear will occur. In some embodiments, cabin blower launch does not occur until Z=X+Y is much greater than the lift-off speed. For instance, the launch speed Z may be at least five times greater, ten times greater or even more than ten times greater than the lift-off speed.

Preferably, the reversal of the variator output is delayed no longer than when the drive pad speed reaches $L_{MAX}$, which is labelled in FIG. 8. $L_{MAX}$ is the speed above which the contribution of the second transmission input 418 cannot equally but oppositely match the contribution of the first transmission input 414. In FIG. 8, $L_{MAX}$ is approximately 2,600 rpm. Above this speed, the speed of the transmission output Z cannot be held at zero and so the cabin blower compressor 402 will be begin to spin and induce bearing wear. Whilst it is preferable that the variator output is reversed at or below $L_{MAX}$, it could nevertheless occur after $L_{MAX}$ if the amount of induced bearing wear in this regime is tolerable.

It will be appreciated that if the HP shaft speed is being accelerated from zero or a very low speed, the dead zone of the cabin blower system 400 may need to be considered. In the dead zone, the second transmission input 418 cannot oppose the first transmission input 414 and so some bearing wear could occur until the HP shaft speed reaches $D_{MAX}$ and the above-described technique can be used.

As noted above, in some designs the dead zone may not exist at all, in which case it can be ignored. In other cases, the dead zone may exist but its contribution to bearing wear may be tolerable, for example if the time taken for the HP shaft to accelerate the drive pad speed to $D_{MAX}$ rpm is small. In other cases still, further measures may be taken to reduce the impact of the dead zone on bearing wear.

Referring again to FIG. 7, the cabin blower system 400 may include a disconnect arrangement 430 that is operable to selectively connect and disconnect the gas turbine engine outputs A, B from the cabin blower compressor 402. As well as generally providing a means of disconnecting the cabin blower system 400 in case of a fault or other operational issue, the disconnect arrangement 430 could be controlled so as to connect the cabin blower compressor 402 to the gas turbine engine only when HP shaft speed has passed the dead zone. It will be understood that the disconnect arrangement 430 may be located in a number of different places, including between the gas turbine engine outputs A, B and the transmission 410 (either side of the variator 415) or between the transmission 410 and the cabin blower compressor 402. The disconnect arrangement could take any suitable form, including a controllable clutch or electromechanical arrangement.

Additionally or alternatively, where an electric variator 415 is used, an energy storage device such as a battery or capacitor could be used to power the second electrical machine 120, 220, 320 until the HP shaft speed reaches $D_{MAX}$. This would effectively eliminate the dead zone and allow the above-described techniques to be used from zero HP shaft speed. It will be understood that an alternative electrical power source could be used in place of an energy storage device, for example an external system such as a cart or auxiliary power unit.

Thus, described above are cabin blower systems 400 and methods of operating cabin blower systems in which contactless bearing wear can be reduced. Whilst starting up the cabin blower system 400, the reverse output of a reversible variator 415 is used to hold the cabin blower compressor at zero or reduced speed until a start-up threshold condition is met. At this point, the output of the reversible variator 415 is reversed to the forward direction to accelerate the cabin blower compressor 402 to a speed close to, equal to or beyond the lift-off speed of the contactless bearing arrangement 403. In the example of FIG. 8, the threshold condition has been described as a minimum speed of the accessory gearbox drive pad speed (or equivalently the HP shaft speed upon which it depends), which should preferably be but need not be less or equal to $L_{MAX}$. In other cabin blower systems, other thresholds could be used. For example, the threshold condition could be a minimum speed of the IP shaft; minimum speeds for both of the HP and IP shafts; or a threshold for a metric that is a function of the IP and/or HP shaft speed. Any suitable threshold condition for reversal of the variator output which, when implemented, reduces bearing wear may be used.

Figure 9:
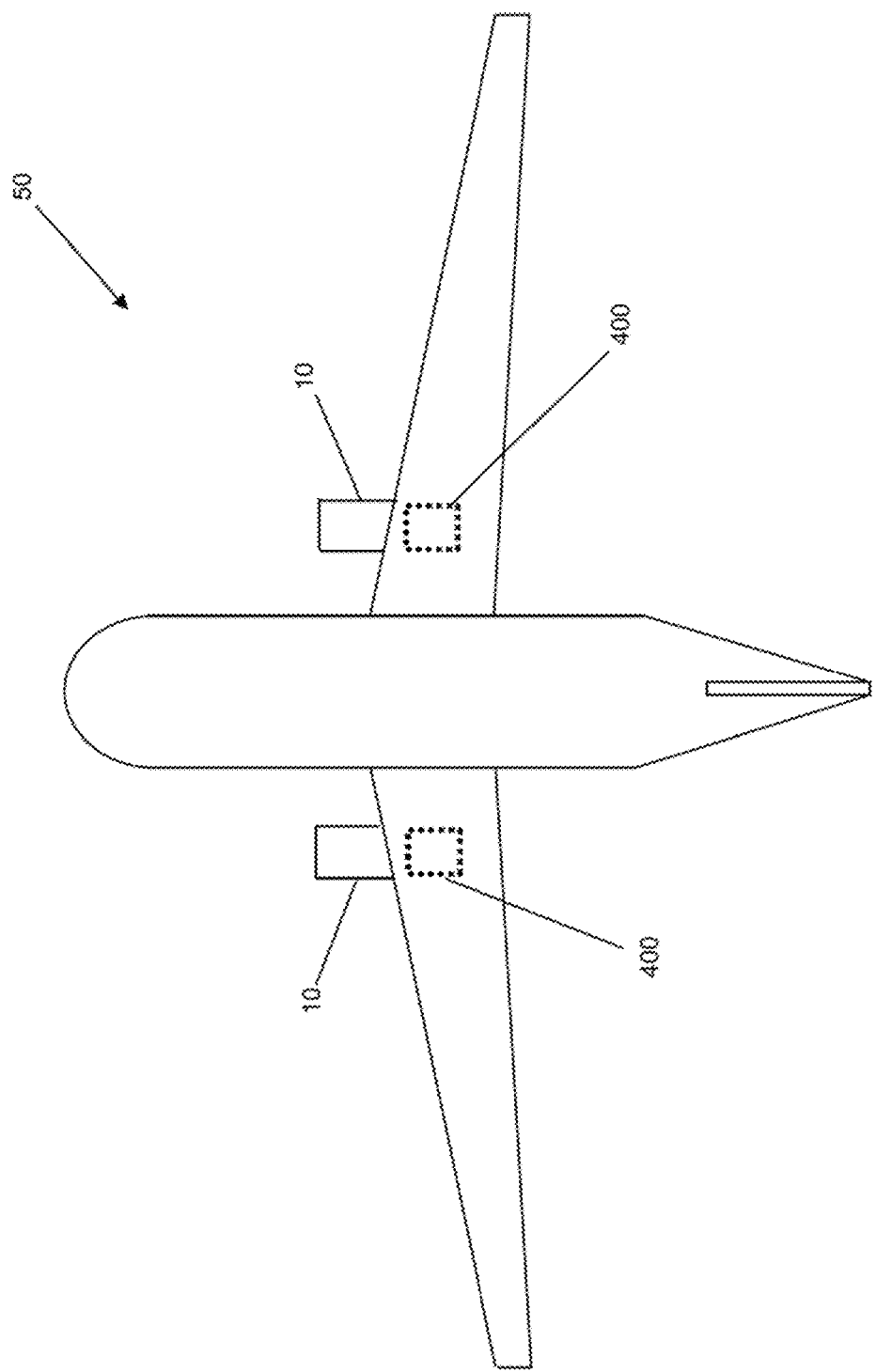
FIG. 9 is a plan view of an aircraft including two engines and a cabin blower system.

Depicted in FIG. 9 is an aircraft 50 including two gas turbine engines 10 and two associated cabin blower systems 400.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An aircraft cabin blower system comprising:
a cabin blower compressor having a contactless bearing arrangement;
a transmission having: a transmission output arranged to drive the cabin blower compressor; a first transmission input arranged to receive mechanical power from a gas turbine engine; and a second transmission input;
a reversible variator arranged to receive power from the gas turbine engine and to output mechanical power from a variator output to the second transmission input, the reversible variator operable to output in both forward and reverse directions of rotation; and
a controller configured to control a speed of the variator output and a direction of rotation of the variator output, wherein:
a speed of the transmission output is a function of a speed of the first transmission input, a speed of the second transmission input and the direction of rotation of the variator output, the second transmission input increasing the speed of the transmission output when the variator output rotates in the forward direction and reducing the speed of the transmission output when the variator output rotates in the reverse direction; and
the controller is configured so that, during a start-up process of the cabin blower system, the variator output is controlled to rotate in the reverse direction until a start-up threshold condition is satisfied and then reversed to rotate in the forward direction.

2. The aircraft cabin blower system of claim 1, in which the controller is configured to control the speed of the variator output so that, until the start-up threshold condition is satisfied, the speed of the transmission output is substantially equal to zero.

3. The aircraft cabin blower system of claim 1, in which the start-up threshold condition is defined so that, when the start-up threshold condition is satisfied and the reversible variator rotates in the forward direction, the speed of the transmission output is accelerated to a speed greater than or equal to a predefined output speed.

4. The aircraft cabin blower system of claim 3, in which the predefined output speed is greater than or equal to a lift-off speed of the contactless bearing arrangement.

5. The aircraft cabin blower system of claim 1, in which the start-up threshold condition is a threshold minimum speed for the first transmission input.

6. The aircraft cabin blower system of claim 1, further comprising a disconnect arrangement for selectively disconnecting one or more of the cabin blower compressor, tile transmission, or the reversible variator from the gas turbine engine.

7. The aircraft cabin blower system of claim 1, in which the contactless bearing arrangement is an air bearing arrangement or a magnetic bearing arrangement.

8. The aircraft cabin blower system of claim 1, in which:
the first transmission input and the reversible variator receive mechanical power from a same shaft of the gas turbine engine; or
the first transmission input receives mechanical power from a first shaft of the gas turbine engine and the reversible variator receives mechanical power from a second shaft of the gas turbine engine, the first and second shafts being different shafts.

9. The aircraft cabin blower system of claim 1, in which the reversible variator is a reversible electric variator; a reversible hydraulic variator; or a reversible toroidal variator.

10. The aircraft cabin blower system of claim 1, in which the speed of the variator output is continuously variable.

11. The aircraft cabin blower system of claim 1, further having a starter mode of operation in which the reversible variator and/or the transmission outputs mechanical power to the gas turbine engine to facilitate starting of the gas turbine engine.

12. The aircraft cabin blower system of claim 1, in which the reversible variator is an electric variator comprising:
a power management system;
a first electrical machine arranged to receive, in a blower mode of operation, mechanical power from the gas turbine engine and to output electrical power to the power management system; and
a second electrical machine arranged to receive, in the blower mode of operation, electrical power from the power management system and to output mechanical power to the second transmission output,
wherein at least the second electrical machine is operable to rotate in both the forward and reverse directions of rotation.

13. The aircraft cabin blower system of claim 12, in which the power management system comprises an electrical energy storage device, whereby the second electrical machine is configured to receive, in the blower mode of operation, electrical power from both the first electrical machine and the electrical energy storage device.

14. The aircraft cabin blower system of claim 12, in which the power management system is arranged to receive electrical power from an external power source.

15. An aircraft comprising an aircraft cabin blower system of claim 1.

16. A method of operating an aircraft cabin blower system, the aircraft cabin blower system comprising a cabin blower compressor having a contactless bearing arrangement; a transmission having a transmission output arranged to drive the cabin blower compressor, a first transmission input arranged to receive mechanical power from a gas turbine engine, and a second transmission input arranged to receive mechanical power from a variator output, the method comprising:
receiving inputs from the gas turbine engine at the first transmission input and a variator input;
controlling a direction of rotation of the variator output so that the first and second transmission inputs oppose each other;
determining that the inputs at the first transmission input and the variator input satisfy a start-up threshold condition; and
responsive to the determination, reversing the direction of rotation of the variator output.

17. The method of claim 16, further comprising, prior to determining that the inputs satisfy the start-up threshold condition:
controlling a speed of rotation of the variator output so that the speed of the transmission output is substantially equal to zero.

18. The method of claim 16, in which determining that the start up threshold condition is satisfied comprises:
determining that a speed of the first transmission input and/or the variator input is greater than or equal to a minimum input speed.

19. The method of claim 16, in which, after reversing the direction of rotation of the variator output, a speed of the transmission output is accelerated to a speed greater than or equal to a lift-off speed of the contactless bearing arrangement of the cabin blower compressor.

20. The method of claim 16, in which a speed of the transmission output is equal to $Z=X\pm Y$, X being a contribution to the speed of the transmission output from the first transmission input, Y being a contribution to the speed of the transmission output from the second transmission input and having a predefined maximum value of $Y_{MAX}$, wherein X increases during a start-up of the cabin blower system, and wherein the start-up threshold condition is satisfied and the direction of rotation of the variator output is reversed before X is equal to $Y_{MAX}$.

\* \* \* \* \*